United States Patent [19]
Park et al.

[11] Patent Number: 5,889,998
[45] Date of Patent: Mar. 30, 1999

[54] TRANSLATION SCHEME FROM OBJECT ORIENTED CHILL TO CHILL FOR THE VISIBILITY OF THE MERETA MODE

[75] Inventors: Kyung-Sook Park; Joon-Kyung Lee; Dong-Gill Lee; Wan Choi, all of Daejeon, Rep. of Korea

[73] Assignees: Electronics and Telecommunications Research Institute, Daejeon; Korea Telecommunication Authority, Seoul, both of Rep. of Korea

[21] Appl. No.: 828,695

[22] Filed: Mar. 31, 1997

[30] Foreign Application Priority Data

Aug. 14, 1996 [KR] Rep. of Korea .................. 96-33693

[51] Int. Cl.[6] ................................... G06F 9/45
[52] U.S. Cl. ................ 395/708; 395/709; 395/704; 395/182.11; 395/701
[58] Field of Search .................... 395/610, 674, 395/704, 702, 500, 182.11, 703, 701, 709; 711/103; 364/192

[56] References Cited

U.S. PATENT DOCUMENTS

| 4,628,508 | 12/1986 | Sager et al. | 395/182.11 |
| 5,101,491 | 3/1992 | Katzeff | 395/500 |
| 5,634,126 | 5/1997 | Norell | 395/674 |
| 5,764,977 | 6/1998 | Aissa et al. | 395/610 |
| 5,794,043 | 8/1998 | Kolb | 395/704 |

OTHER PUBLICATIONS

Object oriented methology for switching software reuse, Zhou Chen & Chen Junliang, IEEE Singapore ICCS/ISITA 92, Communication on the move, vol. 1, pp. 178–182, 1992.

Hierarchically structured switching software, Keiichi Koyanagi, Takao Shimizu & Shuji Tomita, Proceedings of Globecom 93, IEEE Global Telecommunications Conference, vol. 3, pp. 1918–1922, 1993.

An object oriented approach for structuring ISDN call processing software, W. Gunther & G. Wackerbarth, IEEE Softaware engineering for telecommunication systems & services, Eighth International Conference, pp. 72–76, 1992.

A concurrent object oriented switiching program in Chill, Maruyam, K., Nobuyuki Watanabe, Keiich Koyanagi et al. IEEE Communication News, vol. 29, issue 1, pp. 60–68, 1991.

ITU–T; Telecommunication Standardization Sector Of ITU; CCITT High Level Language (Chill); (Preprint of the 1997 version); contents I–VI; pp. 39–45 and 169–172.

*Primary Examiner*—Tariq R. Hafiz
*Assistant Examiner*—Anil Khatri
*Attorney, Agent, or Firm*—Antonelli, Terry, Stout & Kraus, LLP

[57] ABSTRACT

An improved grant/seize processing method with respect to a Moreta-mode when converting an object-oriented CHILL to a CHILL which is capable of defining a syntax having a new characteristic which is capable of granting/seizing by the module unit with respect to a Moreta mode when converting the object-oriented CHILL into the CHILL and granting/seizing by the module unit in the CHILL with respect to the Moreta-mode by using the syntax, for thus achieving excellent effect for providing a function similar to the grant/seize of an actual Moreta-mode.

4 Claims, 2 Drawing Sheets

TRANSLATION SCHEME FROM OBJECT ORIENTED CHILL TO CHILL FOR THE VISIBILITY OF THE MERETA MODE

BACKGROUND OF THE INVENTION

1. Field of the Invention

The present invention relates to a grant/seize processing method with respect to a Moreta-mode when converting an object-oriented CHILL to a CHILL, and in particular to an improved grant/seize processing method with respect to a Moreta-mode when converting an object-oriented CHILL to a CHILL which makes it possible to define a syntax having a new characteristic which is capable of granting/seizing by the module unit with respect to a Moreta mode when converting an object-oriented CHILL into the CHILL and grant/seize by the module unit in the CHILL with respect to the Moreta-mode by using the syntax, for thus achieving an excellent effect for providing a function similar to the grant/seize of an actual Moreta-mode.

2. Description of the Conventional Art

The object-oriented CCITT high level language (CHILL) is a standard computer programming language which was recommended by ITU-T and is capable of improving a reusing and module characteristic of a communication system software. Major characteristics of the object-oriented CHILL is a better object-oriented feature, an overloading property, and a generosity. Generally, the object-oriented feature is referred to a predetermined concept such as an information hiding, an abstract data, an inheritance, and a polymorphism feature. In the object-oriented CHILL, the above-described features are defined in the Moreta-mode. Here, the Moreta-mode is a complicated mode and is classified into a module mode having a sequential characteristic, a region mode having a monitoring characteristic, and a task mode having a parallel characteristic.

Here, the module mode has an attribute in which an element data and an element procedure are combined, and a module characteristic in which an executable statement is not given. This module mode is sequentially executed, and has a characteristic which is not excluded from each other with respect to an external multiple access.

The region mode has an attribute of a module mode and has a threshold value with respect to an element procedure having a public visibility which may be externally checked. This region mode is sequentially performed and has a characteristic of excluding from each other by using a semaphores with respect to an external multiple access.

The task mode has an attribute of the module mode, and a parallel characteristic. In addition, this task mode has a thread control of a message queue of a buffer location and a signal name in accordance with the implementation dependent. In particular, the task mode is performed in parallel, and selects a sequential message with respect to an external multiple access, and has an inter-exclusive characteristic.

With the above-described characteristics, the Moreta-mode has a specification object for external interface, an actually performed object, and a body for performing the predetermined library.

The succession of the Moreta-mode will now be explained. In order to define a derived module mode, in the module mode based on the object-oriented characteristic, it is possible to define the derived module mode by adding a new attribute based on the name of the upper module mode. In addition, since the definition of the module mode is simple and flexible, the module mode may effectively be defined by a new function to the existing module mode. Various derived module modes from the upper module mode can have the attribute of the upper module mode.

Generally, the upper module mode and the derived module mode have an is-a relationship, and the derived module mode may have attributes more than the upper module mode. Here, the is-a relationship denotes that all elements and the visibility of elements are succeeded to the derived module mode. The succession of the elements of the upper module mode and the visibility of each element are succeeded based on the following rules.

The constructor and destructor of the upper module mode are not succeeded.

All elements (namely, such as a SYNONYM statement, a SYNMODE/NEWMODE statement, a DCL statement, a method definition and a GRANT/SEIZE statement) except for the constructor and destructor method which form the upper module mode are directly succeeded.

Since the GRANT statement is directly succeeded, the range of the visibility with respect to each element in the upper module mode is succeeded without any changes.

The visibility of the Moreta-mode will now be explained.

The internal attribute of the Moreta-mode does not externally appear. In order to view the internal attribute of the Moreta-mode from the outside, in the Moreta-mode, the GRANT statement is used. The Moreta-mode has the following three visibility.

The private visibility: The range of the visibility is in its module mode.

The internal visibility: The range of the visibility is from its range to the derived module mode which is derived from itself.

The public visibility: The range of the visibility is to the outer range of the module including itself and derived module mode.

The conversion rule of the Moreta-mode will now be explained. There are two methods for developing the object-oriented CHILL compiler. The first method is directed to converting the object-oriented CHILL to a code which is adapted to the existing CHILL language grammar and using the existing CHILL compiler. The second method is directed to newly developing the compiler for the object-oriented CHILL which is a new language. In the present invention, as the first method, the object-oriented CHILL compiler is considered, and the object-oriented converter for converting the object-oriented CHILL to the CHILL is considered. Therefore, it is necessary to establish the conversion rule for converting the object-oriented CHILL to the CHILL. Since the Moreta-mode is the mode defined by the object-oriented CHILL, so that the functions of the CHILL must be used. The Moreta-mode is converted into the module when the mode is converted into the existing CHILL, and the elements of the Moreta-mode are created as the internal elements. If the Moreta-mode is the succeeded and derived Moreta-mode, the elements of the upper Moreta-mode succeeded are included as the module internal elements. Here, there are the following elements of the Moreta-mode.

The SYNONYM statement

The SYNMODE/NEWMODE statement except for the Moreta-mode

The DCL statement

The procedure definition

The process definition (Except in the region mode or the task mode)

The signal definition (Except in the task mode)

The public/seize statement

The method for converting to the CHILL from the elements of the Moreta-mode is directed to converting the data declared to the DCL into the elements of the STRUCT mode having the Moreta name. Namely, the remaining elements are converted into the CHILL name in accordance with the name translation rule. Therefore, when one Moreta-mode is changed to the CHILL, there are created a predetermined number of names. In addition, when the mode is changed to the CHILL, it is impossible to know the relationship between the Moreta-mode and the elements thereof.

The GRANT/SEIZE of the Moreta-mode will now be explained. The Moreta-mode of the object oriented CHILL is converted into the module of the CHILL. The module in the CHILL has a program structure for determining the visibility of the name thereof, and it is possible to use the name defined in the module. In order to use the name existing in the upper module, it is necessary to seize the name. In order to use the name in the out of module, the name must be granted. Therefore, the grant/seize of the CHILL is done by the name unit. However, the grant/seize with respect to the Moreta-mode of the object-oriented CHILL is not granted by one name unit. Namely, the characteristic of the grant/seize is provided by the module unit. When converting the grant/seize of the Moreta-mode by using the grant/seize statement of the CHILL, all the name having the public or internal visibility must be granted/seized with respect to the Moreta-mode name as well as the name which was obtained by converting the elements and the succeeded name.

Therefore, when granting/seizing the Moreta-mode and the name having the Moreta-mode, many names must be granted/seized. In addition, it is impossible to check a collision between the elements which are granted/seized. In order to avoid the above-described problems, a grantm/seizem which is a statement having a new characteristic which is capable of granting/seizing by the module unit with respect to the Moreta-mode is defined. Here, the grantm/seizem is the name of the statement for providing a function of granting/seizing by the module unit, and another name may be used for the name of the statement. The grantm/seizem is capable of providing a function which is capable of granting/seizing by the module unit with respect to the module created in the Moreta-mode, so that it is possible to provide a function which is similar to the grant/seize function of the Moreta-mode. In addition, in the driving mode, the upper mode in the derived mode so as to obtain the information succeeded from the derived mode is created as the seizem upper mode name, so that the information succeeded is defined. In order to classify the public and internal information which externally appear in one module and the private information which is used for the internal purpose, a new public statement is defined. Since the CHILL can not provide the visibility such as the public, internal, private, etc which are provided in the Moreta-mode, when showing the module by using the grantm/seizem, the private name may be shown, for thus causing errors. In order to ovoid the above-described problems, the names of the elements having the public and internal visibility are arranged together with a reserved word which is called the public with respect to the module which is converted by the Moreta-mode, and then the names thereof are shown, for thus defining the information for externally showing them.

As described above, when converting the object-oriented CHILL into the CHILL, and the GRANT or SEIZE with respect to the Moreta-mode into the grant and seize of the existing CHILL, many grant/seize must be disadvantageously shown, so that it is impossible to check the collision therebetween.

SUMMARY OF THE INVENTION

Accordingly, it is an object of the present invention to provide a grant/seize processing method with respect to a Moreta-mode when converting an object-oriented CHILL to a CHILL which overcomes the problems encountered in the conventional art.

It is another object of the present invention to provide an improved grant/seize processing method with respect to a Moreta-mode when converting an object-oriented CHILL to a CHILL which is capable of defining a syntax having a new characteristic which is capable of granting/seizing by the module unit with respect to a Moreta mode when converting the object-oriented CHILL into the CHILL and granting/seizing by the module unit in the CHILL with respect to the Moreta-mode by using the syntax, for thus achieving excellent effect for providing a function similar to the grant/seize of an actual Moreta-mode.

To achieve the above objects, there is provided an improved grant/seize processing method with respect to an object-oriented CHILL to a CHILL which includes the steps of a first step for creating a symbol table and a program structure tree by inputting an object-oriented CHILL program, a second step for selecting a first symbol table entry of the program structure tree, a third step for judging whether the first symbol table entry is a Moreta mode, a fourth step for performing conversion processes when the first symbol table entry is the Moreta mode as a result of the judgement, a fifth step for creating a system upper module name when the first symbol table entry is a derived Moreta mode as a result of the judgement, a sixth step for converting into a CHILL code which is the same as a source code of an object-oriented CHILL program when the first symbol table entry is not the Moreta mode as a result of the judgement, a seventh step for selecting a second symbol entry, an eighth step for judging whether there is the entry of the second symbol table, a ninth step for selecting the first symbol table entry when there exists the second symbol table entry as a result of the judgement and repeatedly performing the steps above, a tenth step for analyzing the names which are granted/seized in the program structure tree when the second symbol table entry does not exist as a result of the judgement, and an eleventh step for creating a CHILL code with respect to an execution statement and terminating the routine.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
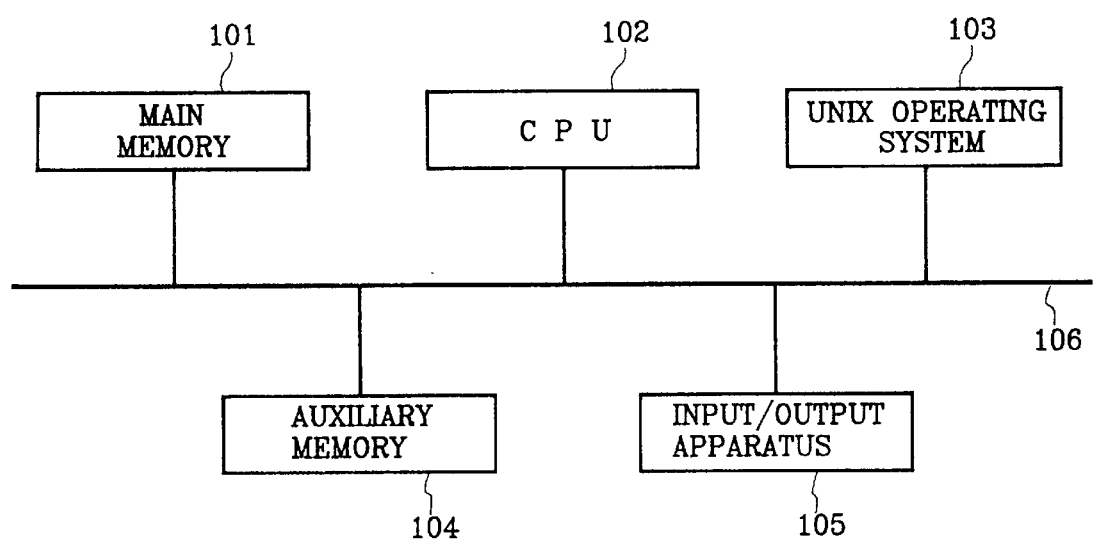
FIG. 1 is a block diagram illustrating the construction of a hardware which is adapted to the present invention.

FIG. 1 is a block diagram illustrating the construction of a hardware which is adapted to the present invention.

As shown therein, a main memory 101 is a circuit for including an object-oriented CHILL translator and related files are includes therein. A central processing unit (CPU) 102 is connected for performing the files in the main memory 101. In addition, an auxiliary memory 104 is connected for storing files and various tools which are not stored in the main memory 101. An input/output apparatus 105 is connected for inputting/outputting all error messages which occur during an operation of files and data which are necessary for performing the object-oriented CHILL translator. A UNIX operating system 103 is connected for controlling the above-described circuits and apparatus and for transferring the message between the circuits and apparatus through a system bus 106.

Figure 2:
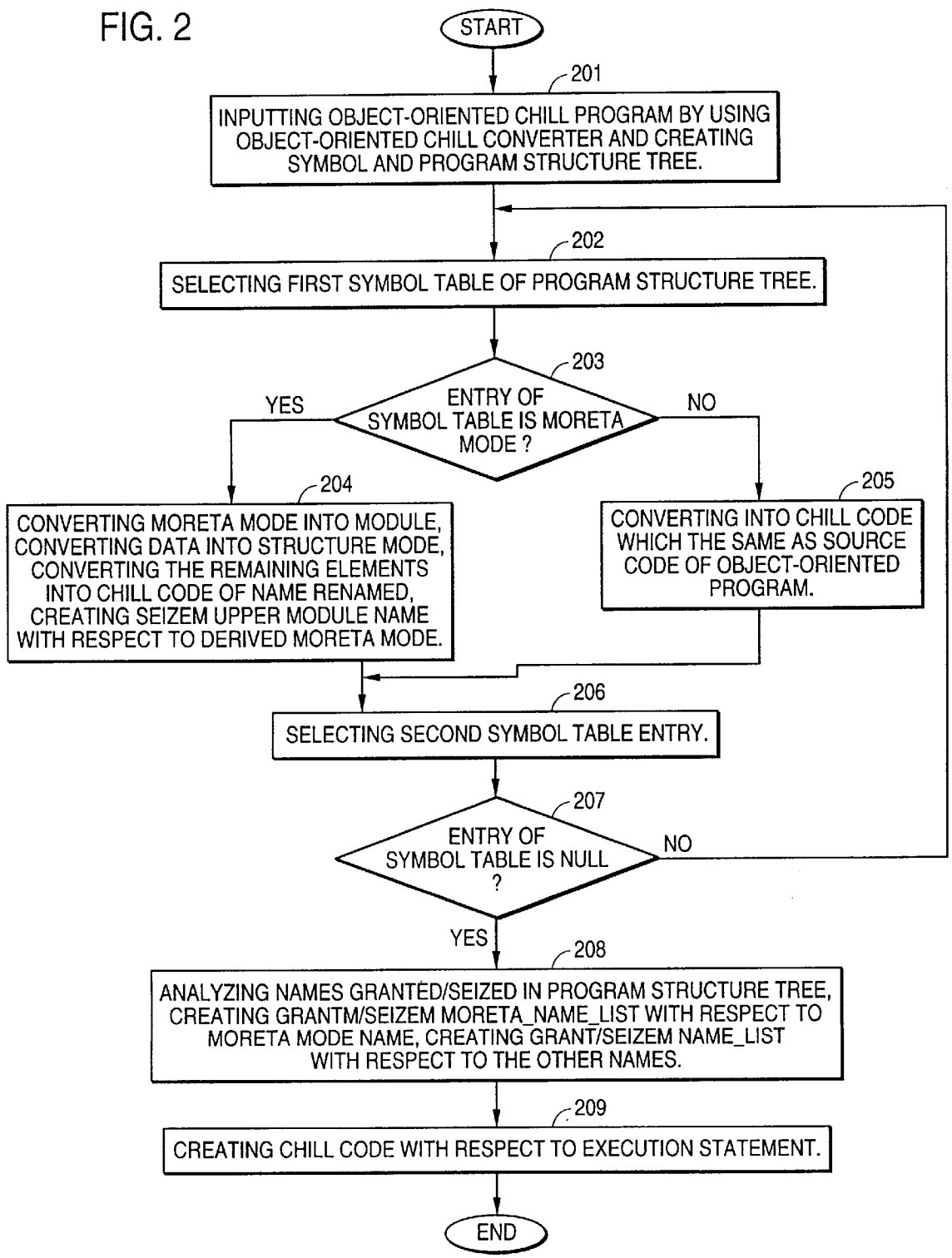
FIG. 2 is a flow chart so as to explain a grant/seize processing method according to the present invention.

FIG. 2 is a flow chart so as to explain a grant/seize processing method according to the present invention.

As shown therein, the object-oriented CHILL translator receives an object-oriented CHILL program and performs a syntax analysis, a visibility analysis, a semantic meaning analysis, and a renaming and creates a symbol table and a program structure tree in step 201. In addition, a first symbol table entry of the program structure tree is selected in step 202. The entry of the symbol is judged to be the Moreta-mode in step 203. If the symbol table entry is the Moreta-mode, the Moreta-mode is converted into the module, and the remaining elements are converted into the CHILL code by using the renamed name. If it is the derived Moreta-mode, the SEIZEM upper module name is created in step 204. If the symbol table entry is not the Moreta mode, it is converted into the CHILL code which is the same as the source code of the CHILL program in step 205. Thereafter, steps 204 and 205 are performed, and then the symbol entry is selected in step 206. The entry of the symbol table is judged to be null in step 207. The procedure feed-backing to step 202 is repeated until the symbol table entry does not exist with respect to the next symbol table entry in accordance with a result of the judgement. The names which are granted and seized in the program structure tree are analyzed, and a grantm/seizem Moreta_Name_List is created with respect to the Moreta name, and a grant/seize Name_List is created with respect to the other names in step 208. The CHILL code is created with respect to the execution statement, and then the routine is terminated in step 209.

As described above, the grant/seize processing method with respect to a Moreta-mode when converting an object-oriented CHILL to the CHILL according to the present invention is directed to defining a syntax having a new characteristic which is capable of granting/seizing by the module unit with respect to a Moreta mode when converting the object-oriented CHILL into the CHILL and granting/seizing by the module unit in the CHILL with respect to the Moreta-mode by using the syntax, for thus achieving excellent effect for providing a function similar to the grant/seize of an actual Moreta-mode.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A grant/seize processing method with respect to a Moreta-mode when converting an object-oriented CHILL (a CCITT high level language) to a CHILL, comprising the steps of:

a first step for creating a symbol table and a program structure tree by inputting an object-oriented CHILL program;

a second step for selecting a first symbol table entry of the program structure tree;

a third step for judging whether the symbol table entry is a Moreta mode;

a fourth step for performing conversion processes when the symbol table entry is the Moreta mode as a result of the judgement;

a fifth step for creating a upper module name when the symbol table entry is a derived Moreta mode as a result of the judgement;

a sixth step for converting into a CHILL code which is the same as a source code of an object-oriented CHILL program when the first symbol table entry is not the Moreta mode as a result of the judgement;

a seventh step for selecting a next symbol entry;

an eighth step for judging whether there is an entry of the symbol table;

a ninth step for selecting the first symbol table entry when there exists the second symbol table entry as a result of the judgement and repeatedly performing the steps above;

a tenth step for analyzing the names which are granted/seized in the program structure tree when the second symbol table entry does not exist as a result of the judgement; and an eleventh step for creating a CHILL code with respect to an execution statement and terminating the routine.

2. The method of claim 1, wherein said symbol table and program structure tree is created by performing a syntax analysis, a visibility analysis, a semantic meaning analysis, and a name renaming.

3. The method of claim 1, wherein said steps of performing each conversion step is directed to converting the Moreta mode into a module, a data into an element of a structure mode, and the remaining elements into a CHILL code of the name renamed.

4. The method of claim 1, wherein said tenth step is directed to creating a grant/seize Moreta_Name_List with respect to the Moreta name, and creating a grant/seize Name_List with respect to the other names.

* * * * *